United States Patent Office 3,455,121
Patented July 15, 1969

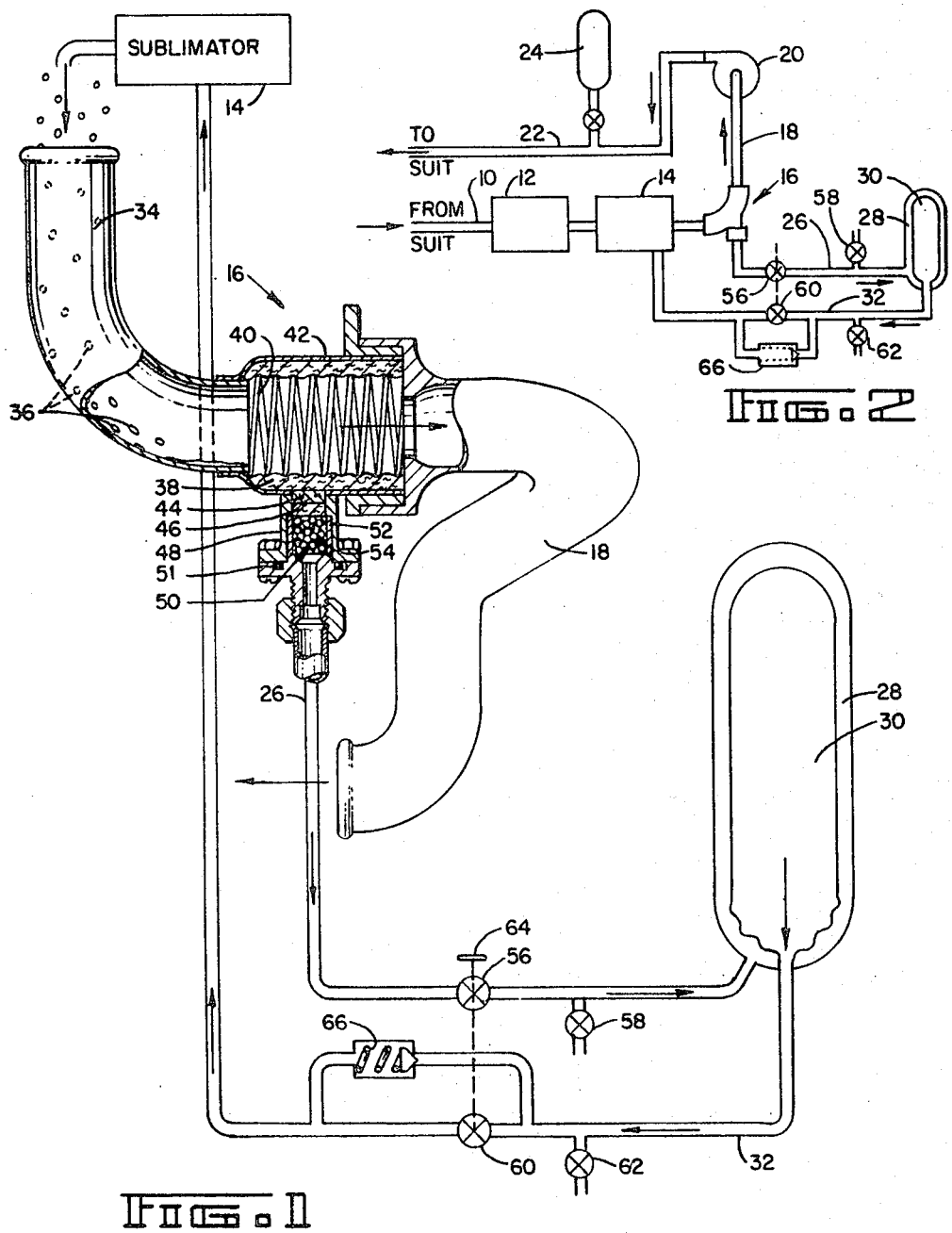

3,455,121
WATER SEPARATING SYSTEM
William W. Beauregard, Agawam, Mass., and Edgar H. Brisson, Hazardville, Conn.; may be granted to National Aeronautics and Space Administration under provisions of 42 U.S.C. 2457(d)
Filed June 28, 1966, Ser. No. 561,223
Int. Cl. B01d 29/00
U.S. Cl. 62—268                                 9 Claims

ABSTRACT OF THE DISCLOSURE

A liquid separating system in which the fluid to be separated is accumulated and then drawn off by a capillary device as a result of a fluid utilization requirement in another part of the system. The capillary device is connected to a storage chamber having a flexible bladder type wall, and the bladder also acts as a supply for fluid utilization means in the system. The fluid drawn off through the capillary device is both stored and used to pressurize the bladder to provide a pressurized fluid supply, and gas flow through the capillary device is regulated in accordance with the pressure to be maintained on the bladder.

ORIGIN OF THE INVENTION

The invention described herein was made in the performance of work under a NASA contract and is subject to the provisions of Section 305 of the National Aeronautics and Space Act of 1958; Public Law 85–568 (72 Stat. 435, 42 U.S.C. 2457).

BACKGROUND OF THE INVENTION

Field of the invention

This invention relates to a liquid separating system. More particularly, this invention relates to a water separating system especially suitable for use in outer space.

An astronaut wearing a space suit must be provided with a supply of properly conditioned oxygen. That is, oxygen must be supplied at the proper temperature and at low humidity. It is possible to dump the oxygen after it has been used by the astronaut and constantly supply the total oxygen requirement from a suply tank. However, this approach is obviously impractical for long duration requirements because of the obviously huge supply of fresh oxygen that will be needed. The alternative approach is to provide a recirculating system for the oxygen, and in this event the oxygen must be decontaminated and controlled for temperature and humidity as it is being recirculated for reuse.

SUMMARY OF THE INVENTION

The present invention provides a water separator for removing moisture from the recirculating oxygen supply. Extensive testing has shown the efficiency of the water separator of the present invention to be exceptionally high, above 98 percent where efficiency is determined by dividing the amount of moisture collected by the amount of moisture condensed. Also, the separator of the present invention removes free moisture with almost no pressure drop and requires no external driving force of any kind.

In the present invention the moisture in the recirculating oxygen stream is separated centrifugally by a 90° change in direction of the stream, and the separated moisture is absorbed by a felt padding. A specially designed highly capillary device draws moisture from the felt padding and fills with water. The capillary device is connected to a reservoir containing a bladder, and the bladder in turn houses the coolant supply for the heat exchanger in the system. As the heat exchanger requirements draw coolant from the bladder, the bladder collapses and creates a suction action to generate a pressure drop across the capillary device and pull a slug of water from the capillary device to the reservoir. As the slug of water is drawn from the capillary device, the capillary device then immediately refills by drawing water off of the felt padding, and the sequence takes place again when the heat exchanger requirements draw more coolant from the bladder. The water drawn from the capillary device to the reservoir behind the bladder is not merely stored in the reservoir, but rather this water serves to maintain pressure on the bladder as the bladder collapses in conjunction with the coolant being drawn off.

The water separator of the present invention is an extremely high efficiency device which requires no external power source, requires only a very low pressure drop for operation, and is of extreme light weight and small volume (both factors being of critical concern in any flight operation and especially in space operation).

Accordingly, one object of the present invention is to provide a novel water separator system for space flight applications.

Another object of the present invention is to provide a novel water separator system for providing humidity control for an astronaut's recirculating oxygen supply.

Still another object of the present invention is to provide a novel water separator system of high efficiency, light weight, and small volume.

Still another object of the present invention is to provide a novel water separator system which requires no external power source.

Other objects and advantages will be apparent from the following detailed description and drawings.

BRIEF DESCRIPTION OF THE DRAWING

In the drawings wherein like elements are numbered alike in the two figures:

FIGURE 1 is an enlarged detail of a part of the system of FIGURE 2.

FIGURE 2 is a schematic of the water separator system of the present invention.

DESCRIPTION OF THE PREFERRED EMBODIMENT

Referring now to FIGURE 1, warm, moist oxygen leaves the helmet of the astronaut's space suit, or any other environment to be controlled, and travels via a conduit 10 to a contaminant control 12 where waste products such as carbon dioxide are removed. The oxygen then travels to a heat exchanger 14 where it is cooled to cause water to condense, the condensation normally being at the rate of approximately 5 cubic centimeters per minute (½ pound of water per hour). The cooled air stream with condensed water particles in suspension then passes to a water separator 16 where the condensed moisture is separated from the oxygen stream. The cool and dehumidified oxygen then passes via a conduit 18 to a fan 20 and is thence returned via a conduit 22 to the astronaut's space suit for reuse. An oxygen supply bottle 24 is connected to conduit 22 through appropriate valving to provide make up oxygen to compensate for any oxygen depletion through losses in the recirculation system just described.

As employed in the present invention, heat exchanger 14 is a subliminator of the porous plate type subliminator such as is described in U.S. Patent No. 3,170,303 issued to G. C. Rannenberg et al. Such an automatic self regulating porous plate subliminator is particularly suited for use in the water separator system of the present invention because it contributes to the realization of an overall water separator system which is itself self regulating and requires no external power supply. However, although it will be understood that the porous plate subliminator of U.S. Patent No. 3,170,303 is clearly the most preferred heat exchanger structure for the present invention, it will also be understood that other types of heat exchangers, of the sublimator class or otherwise, may be employed with the present invention althouih the use of any other type of heat exchanger may require additional controls and power sources and thus result in a system lacking some of the particular advantages of the most preferred embodiment.

Still referring to FIGURE 1, the water separated from the oxygen stream in water separator 16 passes via a conduit 26 to a reservoir 28. A bladder 30 is housed in reservoir 28, bladder 30 housing a supply of feed water or other coolant for sublimator 14. It will be understood that bladder 30 isolates the feed water contained therein from the water stored in reservoir 28. Bladder 30 is connected via a conduit 32 to sublimator 14 to supply the water or other coolant stored in bladder 30 to sublimator 14 to serve as the sublimating refrigerant in sublimator 14 to cool the warm oxygen flowing through the sublimator.

Referring now to FIGURE 2, details of the water separator system of the present invention are shown. The oxygen stream with suspended particles of condensed water is delivered from sublimator 14 to a 90° elbow bend pipe 34 in water separator 16. The condensed water is thrown against the outer wall of pipe 34 due to centrifugal force experienced from the change in direction of the oxygen stream in the 90° elbow. The suspended droplets of water 36 thrown against the outer wall of pipe 34 pass down to and are captured by absorbent annular felt collecting pad 38 of high water affinity material. Collecting pad 38 is preferably of nylon, but it may also be of dacron or other materials which form a pad of high water affinity. A coil spring 40 firmly positions felt pad 38 against housing wall 42 to insure that pad 38 will be properly held in position and will not block the flow path of oxygen from pipe 34 through housing 42 to conduit 18 to which the dehumidified oxygen is delivered for recirculation.

Annular felt pad 38 is in intimate contact with a first felt pad wafer button 44 which is itself in turn in intimate contact with a second felt pad wafer button 46. Felt pad wafer buttons 44 and 46 are both high water affinity pads of the same material as felt pad 38, and these felt pad wafer buttons are held in a housing 48 which also serves as a housing for a highly capillary fused glass bead device 50. Wafers 44 and 46 serve as contact pads to make a continuous contact between and provide a path of water flow between annular felt pad 38 and capillary device 50. Of course, it will be apparent that a single pad could be used rather than the double pad arrangement of pads 44 and 46 as shown. An O-ring seal 51 prevents water leakage from housing 48.

Capillary device 50 is made up of a stainless steel open ended cylindrical housing 52 containing fused glass beads 54. One open end of housing 52 puts the fused glass beads into contact with felt pad 46, and the other open end of housing 52 puts the fused glass beads into communication with conduit 26 which is in turn connected to reservoir 28 behind bladder 30.

As previously pointed out, water from bladder 30 is automatically metered to sublimator 14 via conduit 32 as coolant is sublimated to the vacuum of outer space in accordance with the heat exchange load imposed on sublimator 14 by the warm air from the astronaut's helmet. Bladder 30 contracts as water is drawn or suctioned from the bladder to supply sublimator 14. Capillary device 50 draws water from annular felt collecting pad 38, and capillary device 50 regulates oxygen flow through conduit 26 by filling with water to prevent the escape of any oxygen through conduit 26 except such amounts as are necessary along with water drawn to reservoir 28 to pressurize bladder 30. As bladder 30 contracts when supplying water to sublimator 14, the contracting of the bladder creates a pressure differential ($\Delta P$) as indicated across capillary device 50. This pressure differential is approximately 4 inches of water. The pressure differential causes a slug of water in capillary device 50 to break loose and flow via conduit 26 to water reservoir 28. Capillary device 50 immediately fills with water again by drawing water from annular felt collecting pad 38. This sequence of events wherein water is drawn by sublimator 14 from bladder 30, bladder 30 collapses drawing a slug of water from capillary device 50 to reservoir 28 and capillary device 50 refills by drawing water from felt pad 38 is a repeating sequence of events. The percolator action wherein the collapsing of bladder 30 draws slugs of water from capillary device 50 to reservoir 28 serves a dual purpose. One purpose is to store the water extracted from the recirculating oxygen supply in the dehumidifying process. The other purpose is to maintain pressure behind bladder 30 at the level in conduit 34 as the bladder collapses in supplying water to sublimator 14. This maintaining of pressure behind bladder 30 is necessary to keep the water supply in the bladder under a sufficient pressure so that it may be drawn by the relative vacuum of space to the sublimator. Thus, it can be seen that conduit 26 also serves as a pressure equalization line to maintain the pressure in reservoir 28 behind bladder 30 at the level of the pressure at capillary device 50.

It is, of course, necessary to fill bladder 30 with feed water at the beginning of a mission and to drain reservoir 28 at the end of a mission. To this end, there is a condensate shut off valve 56 and a condensate drain fitting 58 in conduit 26, and a feed water shut off valve 60 and a feed water fill fitting 62 in conduit 32. Shut off valves 56 and 60 are ganged on a common actuator 64, and there is a pressure relief valve 66 around feed water shut off valve 60 in parallel with conduit 32 to allow the bypassing of shut off valve 60 in the event of an over pressurization of bladder 30 when valve 60 is closed. Valves 56 and 60 are open during normal operation of the system. When it is desired to drain reservoir 28 at the end of a mission and refill bladder 30 for another mission, shut off valves 56 and 60 are closed, and the normally closed drain fitting 58 and fill fitting 62 are opened. A supply of feed water is then introduced to bladder 30 through fill fitting 62 and conduit 32 to fill bladder 30 and cause it to expand. The expanding bladder 30 takes up most of the space of reservoir 28 and pushes the water stored in reservoir 28 out through drain fitting 58. After bladder 30 has been filled and reservoir 28 drained, condensate drain fitting 58 and feed water fill fitting 62 are again closed and the system is ready for another mission. Of course, shut off valves 56 and 60 must be returned to the normally open position before another mission can be accomplished.

As has been stated above, capillary device 50 is an extremely high capillary device. A preferred embodiment is comprised of fused glass beads encased in an open ended stainless steel cylindrical housing. In the manufacture of this preferred capillary device, standard commercially available glass beads are poured into a stainless steel cylinder, and the ends of the cylinder are capped to secure the beads in place for heat treating. The cylinder and end caps are cleaned in a carbon tetrachloride or Freon ultrasonic cleaner prior to assembly.

For the heat treating cycle described below the glass beads are No. 615 glass 40–50 U.S. Standard mesh size obtained from Flex-O-Lite Manufacturing Corporation, St. Louis, Mo. For other glass beads, the heat treating cycle would have to be appropriately modified. The capped cylinder with beads therein is placed in a vacuum furnace preheated to 1000° F. plus or minus 25° F. The bead section is then raised to a temperature of 1250° F. plus or minus 25° F. and this temperature is maintained for 5 minutes plus or minus 1 minute. The temperature is then against raised to 1365° F. plus or minus 25° F. and this higher temperature is maintained for 25 minutes plus or minus 1 minute. The bead section is then cooled by first lowering the furnace tempertaure to 1000° F. plus or minus 25° F. and then by nitrogen cooling the beads to room temperature. The glass beads are fused during the heating cycle, and the cylinder containing the fused beads is cut into open ended cylindrical sections one-half inch in length. One such open ended cylindrical section containing fused glass beads is employed as the capillary device 50 in the system described above. The particular preferred capillary device is disclosed and claimed in a U.S. patent application for Capillary Device and Method of Making Same application Ser. No. 561,282 filed June 28, 1966 by the inventors named in this application and assigned to the assignee of this applictaion.

While a preferred embodiment has been shown and described, various modifications and substitutions may be made without departing from the spirit and scope of this invention. Accordingly, it is to be understood that this invention has been described by way of illustration rather than limitation.

What is claimed is:

1. A liquid separating system including:
   means for separating liquid from a gas stream;
   absorbing means positioned to receive separated liquid from said separating means;
   capillary means connected to said absorbing means to draw liquid from said absorbing means, said capillary means including fused glass beads; and
   drawing means communicating with said capillary means for drawing liquid from said capillary means, said fused glass beads with liquid therein and said drawing means cooperating to regulate gas flow through said capillary means in accordance with a pressure requirement of said drawing means.

2. A liquid separating system as in claim 1 wherein said drawing means includes fluid utilization means and suction means, said suction means being connected to said capillary means and said fluid utilization means being connected to said suction means.

3. A fluid separating system as in claim 2 wherein said suction means includes bladder means having a supply of fluid therein for said fluid utilization means, and wherein liquid drawn from said capillary means pressurizes said bladder means.

4. A liquid separating system including:
   means for separtaing liquid from a gas stream;
   absorbing means positioned to receive separated liquid from said separating means;
   capillary means connected to said absorbing means to draw liquid from said absorbing means;
   reservoir means connected to said capillary means to receive liquid from said capillary means;
   liquid storage means in said reservoir means, said liquid storage means having a flexible housing; and
   liquid utilizing means connected to said storage means for drawing liquid from said storage means;
   said flexible housing flexing upon the drawing of liquid from said storage means to draw liquid from said capillary means to said reservoir means.

5. A liquid separating system as in claim 4 wherein said capillary means includes fused glass beads, said capillary means with liquid therein regulating the flow of gas therethrough.

6. A liquid separating system as in claim 4 wherein said liquid storage means is a bladder.

7. A liquid separating system as in claim 4 wherein said liquid utilizing means is heat exchanger means.

8. A liquid separating system as in claim 7 wherein said heat exchanger means is sublimator means.

9. A liquid separating system as in claim 8 wherein said sublimator means is a porous plate sublimator.

References Cited

UNITED STATES PATENTS

| | | | |
|---|---|---|---|
| 2,961,064 | 11/1960 | Fisher | 55—466 |
| 2,997,131 | 8/1961 | Fisher | 55—466 |
| 3,102,800 | 9/1963 | Bora | 55—461 |
| 3,197,973 | 8/1965 | Ronnenberg | 62—268 |
| 3,240,002 | 3/1966 | O'Rourke | 55—466 |
| 3,279,155 | 10/1966 | Lambert | 55—218 |

WILLIAM J. WYE, Primary Examiner

U.S. Cl. X.R.

55—218, 461